US009912723B2

(12) United States Patent
Ren et al.

(10) Patent No.: US 9,912,723 B2
(45) Date of Patent: Mar. 6, 2018

(54) CHAINED SECURITY CREDENTIAL DISTRIBUTION FOR SPONSORED DATA SERVICES

(71) Applicant: Verizon Patent and Licensing Inc., Arlington, VA (US)

(72) Inventors: Dahai Ren, Lincoln, MA (US); Hector Saint-Hilaire, Waltham, MA (US); Shuai Wu, Wellesley, MA (US); Susan Kelly, Maynard, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 253 days.

(21) Appl. No.: 14/985,821

(22) Filed: Dec. 31, 2015

(65) Prior Publication Data

US 2017/0195330 A1    Jul. 6, 2017

(51) Int. Cl.
| | |
|---|---|
| G06F 15/16 | (2006.01) |
| H04L 29/08 | (2006.01) |
| H04W 12/08 | (2009.01) |
| H04L 29/06 | (2006.01) |
| H04W 4/20 | (2018.01) |
| H04W 12/04 | (2009.01) |
| G06Q 30/02 | (2012.01) |

(52) U.S. Cl.
CPC ......... H04L 67/02 (2013.01); G06Q 30/0267 (2013.01); H04L 63/061 (2013.01); H04L 63/104 (2013.01); H04W 4/206 (2013.01); H04W 12/04 (2013.01); H04W 12/08 (2013.01)

(58) Field of Classification Search
CPC ....... H04L 63/10; H04L 63/08; H04L 63/083; H04L 67/02; H04W 12/08; G06F 21/31
USPC .............................................................. 726/5
See application file for complete search history.

(56) References Cited

U.S. PATENT DOCUMENTS

| | | | | |
|---|---|---|---|---|
| 2012/0155380 A1* | 6/2012 | Hodges | .................. | G06Q 30/00 370/328 |
| 2017/0111211 A1* | 4/2017 | Zhang | .................... | G06Q 30/01 |

* cited by examiner

*Primary Examiner* — Evans Desrosiers (57) ABSTRACT

A method to facilitate secure access to sponsored content may include accessing a portal device to generate a campaign for a sponsored data service (SDS), and providing campaign network addresses and customer identifiers associated with the content aggregator device and at least one content partner device. The method includes generating a unique first security credential associated with each of the content partner device(s), and providing information for a notification of the campaign to the portal device, where the information includes the unique first security credential associated with each of the content partner device(s), and where the notification is provided to each of the at least one content partner device. The method includes signing a unique first SDS network address associated with sponsored content provided by each of the content partner device(s), where the signing is performed using the unique first security credential associated with each of the content partner device(s).

20 Claims, 8 Drawing Sheets

CHAINED SECURITY CREDENTIAL DISTRIBUTION FOR SPONSORED DATA SERVICES

BACKGROUND

User access to wireless communication networks and data services typically involves some form of payment made to the network provider. In some instances, a third party may wish to sponsor a user's data consumption in order to entice user engagement. Access to sponsored data may involve data exchanges with content providers configured in various network arrangements, some of which may include aggregators that obtain data from other downstream content providers. Some network arrangements can complicate the management of credentials used to access sponsored data from the downstream content providers.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to approaches for chained security credential distribution for sponsored data services. A sponsored data service (SDS) (which is also referred to herein as a "toll free data service") may include a network service that is financially supported by a third party entity. The third party entity, hereinafter referred to as a "sponsor," subsidizes the network data exchanged between a user device and a specified content provider. The sponsor may have a relationship with the network provider that permits the automatic billing of the sponsor for the exchanged data, instead of the user of a user device. Thus, the data exchanged through the SDS (which may also be referred to herein as "sponsored data" or "sponsored content") is effectively "toll-free" as seen by the user of the user device. The sponsored data may be downloaded to the user device from the specified content provider, and/or uploaded from the user device to the specified content provider.

In order to access the specified content provider and ensure that the sponsor is billed for the sponsored data exchange, a specific SDS network address (also referred herein as an "embedded object" network address) may be generated and used as a network address for a network device hosting sponsored content. Sponsored content may include, for example, content represented as alphanumeric text, graphics, images, audio, and/or video data. An SDS network address may be "signed" using cryptographic techniques to improve security, where the signing process may include appending information to the original network address based on one or more security credential(s) (e.g., a signing Key identifier and/or a signing secret). The signed SDS network address may contain special network destination information of the sponsored content, identifiers of various entities (e.g., a sponsor, a content provider, a content aggregator, etc.), a security signature, and additional parameters that may be used in backend devices by the network provider for data accounting and billing processes. A security credential may be used to sign and/or validate an SDS network address to ensure that billing and/or data accounting is properly performed. For example, validation may ensure that the sponsor is being properly billed only for content authorized by the sponsor, and the content provider is being properly compensated for content which is provided. A user device may access sponsored content by making network requests using the SDS network addresses. In an embodiment, the hyper-text transfer protocol (HTTP) may be used to exchange the data, so the SDS network address may take the form of a sponsored data service universal resource locator (URL) (hereinafter referred to as an "SDS_URL" or a "toll free URL").

In modern network configurations, sponsored content may be provided from a number of different content providers interconnected by one or more networks. In some instances, one or more content providers, in addition to hosting their own content, may act as content aggregators or "middlemen," and provide access to additional content hosted by other "downstream" content providers (also referred to herein as "partner" content providers). In order to maintain proper billing and data accounting integrity, secure methods may be used to provide sponsored data using SDS architectures which may include one or more content aggregators and one or more downstream content providers. Such secure methods can involve the use of security credentials for validation of billing and/or data accounting. In an embodiment, for example, a security credential may include multiple pieces of information, such as, for example, a signing key identifier and a signing secret.

However, the creation and distribution of separate security credentials for each SDS network address may result in a very large number of security credentials to track and maintain, and thus create challenges for the content aggregator and its downstream content providers. Conventional approaches may avoid such challenges by having a content aggregator share the same security credentials across all of the downstream content providers, but sharing security credentials may lower the operational security of the SDS.

Embodiments presented herein reduce the burden of distributing and maintaining a large number of security credentials across multiple content partners by implementing a chained security credential structure. A content aggregator may generate and sign SDS network addresses using security credentials for sponsored content hosted on the content aggregator itself, and may also generate and sign SDS network addresses using separate security credentials for sponsored content hosted on partner content provider(s).

The security credential for each partner content provider are unique and are not shared with other partner content providers nor other content aggregators. Accordingly, security may be enhanced as the security credential for a partner content provider associated with a particular content aggregator is unavailable to any other content providers as well as other content aggregators. Thus, the security credential may be thought of as "chained" because it may only be shared between a single content aggregator and a single partner content provider. Using the security credential, an SDS network address associated with sponsored content hosted by the partner content provider may be signed by both the content aggregator and the partner content provider.

Figure 1:
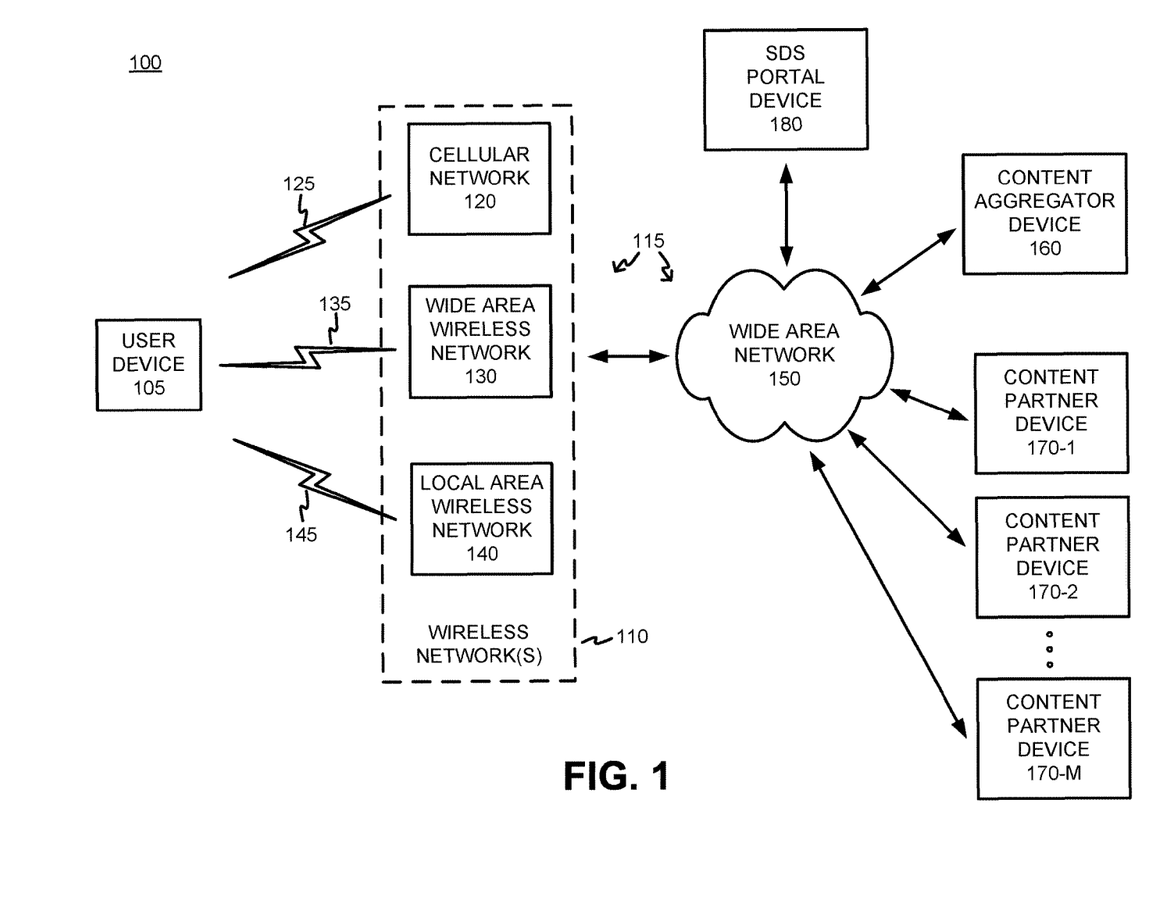
FIG. 1 is a block diagram of an exemplary network environment for facilitating secure access to sponsored data services (SDSs) using chained security credential distribution.

FIG. 1 is a block diagram of an exemplary environment 100 for facilitating secure access to sponsored data services (SDSs) using chained security credential distribution. Environment 100 may include one or more user devices 105, network 115, a content aggregator device 160, one or more content partner devices 170-1, . . . 170-M (referred to plurally or generically as "content partner devices 170 and specifically as "content partner device 170-X," where X=1, . . . , M), and an SDS portal device 180. Network 115 may include one or more wireless network(s) 110 and a wide area network 150. Wireless networks 110 may further include, for example, a cellular network 120, a wide area wireless network 130, and/or a local area wireless network 140. For ease of explanation, only one user device 105, content aggregator device 160 and SDS portal device 180 are illustrated as being connected to network 115. However, it should be understood that a plurality of user devices 105, content aggregator devices 160, SDS portal devices 180, and/or other known network entities may be communicatively coupled to network 115. FIG. 1 depicts a representative environment 100 with exemplary components and configuration shown for purposes of explanation. Other embodiments may include additional or different network entities in alternative configurations than which are exemplified in FIG. 1.

User device 105 may obtain access to network 115 through wireless network(s) 110 over any type of known radio channel or combinations thereof. For example, user device 105 may access cellular network 120 over wireless channel 125. Access over wireless channel 125 may be provided through a base station, eNodeB, etc., within cellular network 120, as will be described in more detail below in reference to an embodiment shown in FIG. 4. In various embodiments, cellular network 120, wide area wireless network 130, and/or local area wireless network 140 may also communicate with each other in addition to user device 105. User device 105 may also access network 115 over wireless channel 135 through wide area wireless network 130. Wide area wireless network 130 may include any type wireless network covering larger areas, and may include a mesh network (e.g., IEEE 801.11s) and/or a WiMAX IEEE 802.16. User device 105 may access network 115 over wireless channel 145 through local area wireless network 140, which may include WiFi (e.g., any IEEE 801.11x network, where x=a, b, g, n, and/or ac). The wireless network(s) 110 may exchange data with wide area network 150 that may include backhaul networks, backbone networks, and/or core networks. Content partner device 170 and/or SDS validation device 180 may interface with wide area network 150, and thus with user device 105 over one or more of the air interfaces 125, 135, 145 through wireless network(s) 110.

User device 105 may obtain SDS access to network 115 over one or more air interfaces 125, 135, and/or 145, which may be supported by the sponsor to provide content to user device 105 through content aggregator device 160 and/or through one or more of content partner device(s) 170. As used herein, content may also be referred to herein as "media," and may include any type of digital data representing user-interpretable information, including text, image, audio, and/or video data. Media may also include one or more combinations of any type of digital data that may be arranged, composited, and presented to the user, such as, for example, in the form of web pages described using hypertext markup language (HTML). Connections for sponsored data exchanges may be established by sponsors who may arrange access for particular events and/or promotions (which may be referred to herein as "campaigns"). The campaigns may be arranged through SDS portal device 180 assigned by the network provider (e.g., a web portal under control of the network provider). In an embodiment, the sponsor may access SDS portal device 180 through content aggregator device 160. Additionally, or alternatively, the sponsor may also access SDS portal device 180 through another independent network device (not shown). When arranging a campaign, the sponsor may set various parameters for the campaign (such as, for example, media specification, time duration, maximum number of users, maximum allotment of data, etc.). The sponsor may also provide campaign network addresses identifying content providers and customer identifiers indicating the identity of a content provider. Accordingly, campaign network addresses and customer identifiers may be entered for content aggregator device 160 and one or more content partner devices 170. The campaign network addresses may be used in generating SDS network addresses which are used to request sponsored content. For example, a campaign network address may be a URL linking to a specific content partner device 170-X, and the SDS network address may be a subdomain of the campaign URL. Accordingly, the SDS network address may be an SDS URL linking to sponsored content (e.g., an embedded object) hosted on content partner device 170-X.

Content aggregator device 160 may host sponsored content, or may rely on sponsored content provided by one or more content partner device(s) 170 to provide content. Content aggregator device 160 may provide access to sponsored content to user device 105 via network 115, using signed SDS network addresses which are associated with sponsored content. For example, in an embodiment, content aggregator device 160 may host a "parent page" which contains a list of signed SDS network addresses serving as links to sponsored content that are accessible to user device 105. For example, content aggregator device 160 could host an HTML based webpage having a list of signed URLs which link to embedded objects hosted on content aggregator device 160 and/or one or more of content partner devices 170.

In more detail, for example, content aggregator device 160 may initially sign an SDS network address using a unique security credential which may be shared only with a single content partner device 170-X. Content aggregator device 160 may then make the signed SDS network address available, for example through the parent page, for access by user device 105 for requesting sponsored content from content partner device 170-X. When content partner device 170-X subsequently receives a request for sponsored content from user device 105 using the signed SDS network address made available by content aggregator device 160, content partner device 170-X may re-sign the SDS network address used to make the request. By comparing the signed SDS network address received in the request and the re-signed SDS network address, content partner device 170-X may validate the request for sponsored content. Once the request for sponsored content is validated, sponsored content may be released and provided to the requesting user device 105.

With user device 105, mobile applications and/or web pages downloaded through a mobile browser may use one or more software development kits that support the SDS. Such mobile applications and/or websites may download sponsored content by making network requests using the appropriate signed SDS network addresses. The SDS requests may be intercepted by the network provider's existing service platform backend infrastructure, which may track downloaded SDS data and bill the sponsor for the cost of the data used by the campaign.

Further referring to FIG. 1, user device 105 may include any type of electronic device having communication capabilities, and thus communicate over network 115 using a variety of different channels, including both wired and wireless connections. User device 105 may include, for example, a cellular radiotelephone, a smart phone, a wearable computer (e.g., a wrist watch, eye glasses, etc.), a tablet, a set-top box (STB), a mobile phone, any type of IP communications device, a Voice over Internet Protocol (VoIP) device, a laptop computer, a palmtop computer, a gaming device, a media player device, or a digital camera that includes communication capabilities (e.g., wireless communication mechanisms). User device 105 may use applications or websites to download sponsored content by making network requests using the signed SDS network addresses. Requests for sponsored content may be intercepted by network devices in backend infrastructure (not shown) which are responsible for tracking downloaded toll free data and billing sponsors campaign for cost of data used.

Wireless network(s) 110 may include one or more wireless networks of any type, such as, for example, a local area network (LAN), a wide area network (WAN), a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Wide area network 150 may be any type of wide area network connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Content aggregator device 160 may be any type of network device (e.g., a web server, computer, media repository, streaming source, etc.) that may provide access to sponsored content via signed SDS network addresses. The signed SDS network address may link to sponsored content which is hosted locally on content aggregator device 160, or remotely on one or more content partner devices 170. Content aggregator device 160 may be owned by the sponsor or act as agent of the sponsor, serving as a "middle man" to provide access for sponsored content to user device 105 from any content provider identified by signed SDS network identifiers. Content aggregator device 160 may host and/or provide links to any type of media, such as, for example, text, audio, image, video, software code, etc. In some embodiments, content aggregator device 160 and content partner device(s) 170 may switch roles, where content aggregator device 160 performs the functions of a content partner device, and content partner device(s) 170 perform the functions of a content aggregator device 160.

Content partner devices 170 may be any type of network device (e.g., a web server, computer, media repository, streaming source, etc.) that may respond to requests from user device 105, using signed SDS network addresses, to provide any type of content or media. Content partner device 170 may store and provide any type of media, such as, for example, text, audio, image, video, software code, etc. Alternatively, content partner device 170 may be, or provide a connection to, another communications provider (e.g., other wireless carrier, over the top (OTT) service, etc.), and thus provide user device 105 with voice, text, and/or video communications from other sources outside the control of the network service provider. Content partner device(s) 170 act as downstream network providers to content aggregator device 160, where content aggregator device 160 provides access to signed SDS network addresses which may be used to obtain sponsored content by user device 105. In an embodiment, the signed SDS network address provided by content aggregator device 160 is used by mobile device to request content directly from content partner device(s) 170. Thus bandwidth for delivering sponsored content from content partner device(s) 170 to user device 105 does not need to go through content aggregator device 160.

SDS portal device 180 may be any type of network device, such as, for example, a server, computer, etc., that receives information from sponsors and/or their agents to generate and modify a campaign for sponsored data. In embodiments provided herein, the sponsor may designate content aggregator device 160 (either under the direct control of the sponsor, or as a designated agent) to create the campaign by logging into SDS portal device 180 to supply campaign network addresses (e.g., campaign URLs) for content providers and customer identifiers (e.g., customer identification numbers) associated with the campaign network addresses. Content providers may include one or more content partner devices 170 and/or content aggregator device 160, as content aggregator device 160 may locally host its own sponsored content, in addition to providing access to signed SDS network address linking to sponsored content on remote content partner devices 170. Content partner devices 170 may also log into SDS portal device 180 to obtain security credentials used for signing SDS network addresses to validate requests from user device 105.

Figure 2:
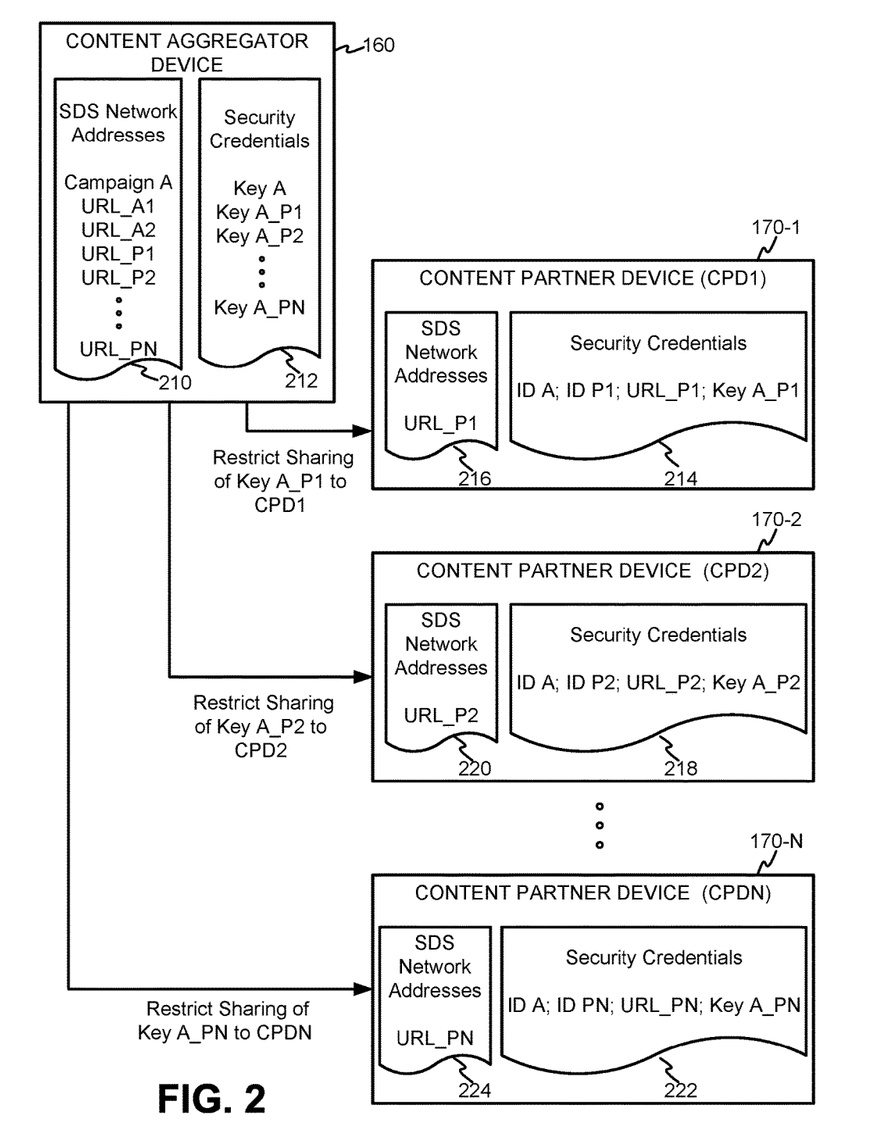
FIG. 2 is a diagram of an embodiment showing the distribution of security credentials between a content aggregator device and multiple content partner devices.

FIG. 2 is a diagram of an embodiment showing the distribution of security credentials from content aggregator device 160 to multiple content partner devices 170-1 through 170-N. For a particular campaign (shown as campaign A in FIG. 2), content aggregator device 160 may store a set of SDS network addresses 210 which link to sponsored content on content aggregator device 160 and on content partner devices 170-1 through 170-N. Each SDS network address may take the form of HTML URLs which link to embedded objects as sponsored content. For example, URL_A1 and URL_A2 link to sponsored content hosted on content aggregator device 160, URL_P1 may link to sponsored content hosted on content partner device 1 170-1, URL_P2 may link to sponsored content hosted on content partner device 2 170-2, and URL_PN may link to sponsored content hosted on content partner device N 170-N.

Content aggregator device 160 may generate and store a set of security credentials 212 uniquely associated with each content partner device 170 hosting sponsored content. The security credentials may be used to sign SDS network addresses in order to properly validate requests for sponsored content on a particular host. In an embodiment, the security credentials may take the form of key pairs which include a signing key identifier and a signing secret (shown as "Key X" in FIG. 2, where X=A, A_P1, A_P2, . . . , or A_PN). For example, Key A may be uniquely associated with content aggregator device 160 and be used to sign requests associated with sponsored content hosted on content aggregator device 160. Key A_P1 may be uniquely associated with content partner device 1 170-1 and be used to sign requests associated with sponsored content hosted on content partner device 1 170-1. Key A_P2 may be uniquely associated with content partner device 2 170-2 and be used to sign requests associated with sponsored content hosted on content partner device 2 170-2. Key A_PN may be uniquely associated with content partner device N 170-N and be used to sign requests associated with sponsored content hosted on content partner device N 170-N.

Each content partner device 170 may receive a unique security credential from content aggregator device 160 associated with campaign A. The security credential may be provided to SDS portal device 180, which may be subsequently forwarded onto the content partner device 170. Alternatively, the security credential may be directly provided from content aggregator device 160 to the content partner device 170-X. The security credentials are unique to each content partner device 170, and the sharing of the security credentials is restricted such that the security credentials are not shared among different content partner devices 170. Each content partner device 170 may store a set 214 of received security credentials. For a different campaign on the same content aggregator device 160, a different security credential may be provided to each content partner device 170 to maintain security between separate campaigns. As will be shown in FIG. 3, different campaigns from different content aggregator devices may also have unique security credentials for each content partner device 170.

Security credentials received at each content partner device 170 are stored therein, along with other information in a set of stored security credentials 214. In addition to the security credential itself, other information may be stored in the set of security credentials 214. In an embodiment, content partner device 170-X may store, for example, the identity of the campaign A, the identity of the content partner device X, the SDS network address associated with sponsored content hosted on content partner device 170-X, and a security key received from content aggregator device 160. Accordingly, in an embodiment as shown in FIG. 2, content partner device 170-1 may receive Key A_P1, either indirectly or directly from content aggregator device 160. Key A_P1 is not shared with any other content partner devices 170, nor with any other content aggregator device (not shown in FIG. 2). Content partner device 170-2 may receive Key A_P2, either indirectly or directly from content aggregator device 160. Key A_P2 is not shared with any other content partner devices 170, nor with any other content aggregator devices. Content partner device 170-N may receive Key A_PN, either indirectly or directly from content aggregator device 160. Key A_PN is not shared with any other content partner devices 170, nor with any other content aggregator devices.

Thus, the security credentials generated by content aggregator device 160 and each respective content partner device 170-X are chained, as they cannot be used to sign and/or validate content hosted from other content partner devices 170. By restricting who may receive the security credentials (e.g., signing keys and shared secrets), the security of the SDS is increased.

Figure 3:
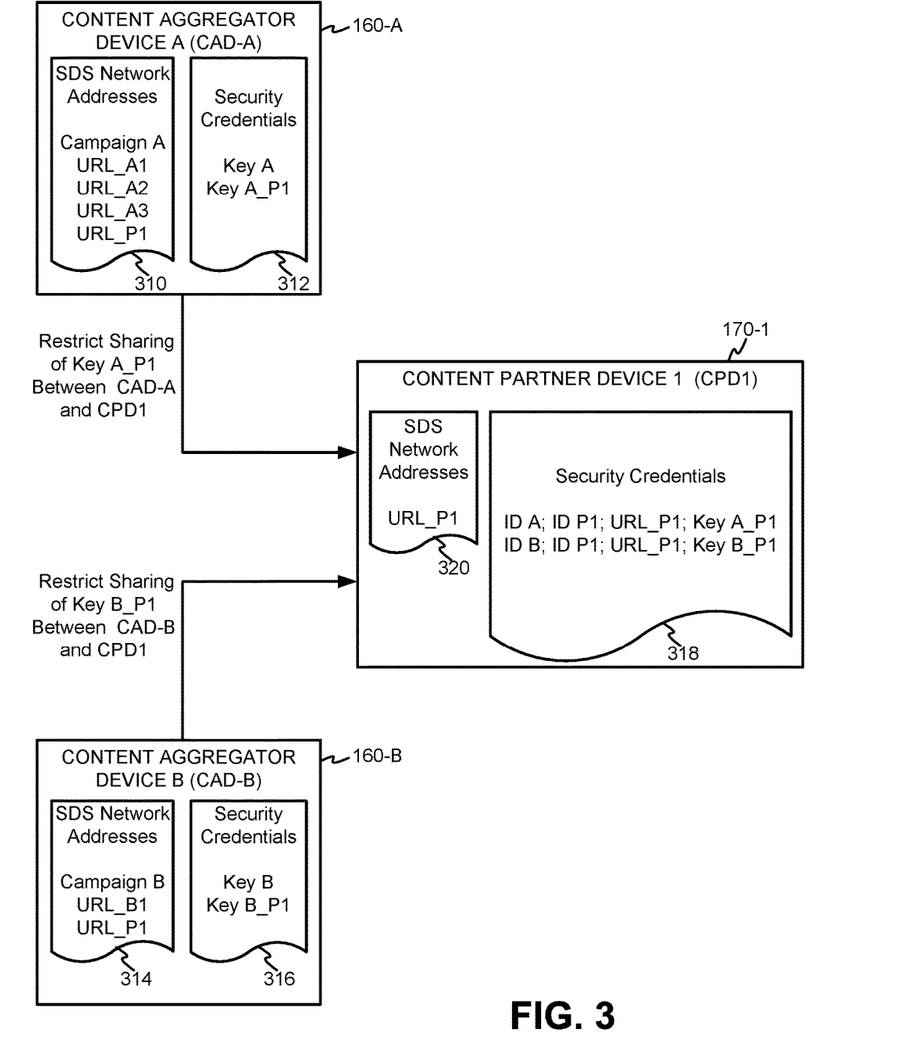
FIG. 3 is a diagram of an embodiment showing the distribution of security credentials between multiple content aggregator devices and a content partner device.

FIG. 3 is a diagram of an embodiment showing the distribution of security credentials from two content aggregator devices 160-A, 160-B to a content partner device 170-1. Content aggregator device A 160-A is associated with campaign A, and content aggregator device B 160-B is associated with campaign B. For a campaign A, content aggregator device A 160-A may store a set of SDS network addresses 310 which link to sponsored content on content aggregator device A 160-A, and also link to sponsored content on content partner device 170-1. For a campaign B, content aggregator device B 160-B may store a set of SDS network addresses 314 which link to sponsored content on content aggregator device B 160-B, and also link to sponsored content on content partner device 170-1.

Each SDS network address may take the form of HTML URLs which link to embedded objects as sponsored content. For example, for campaign A, content aggregator device A 160-A stores URL_A1, URL_A2 and URL_A3 that link to sponsored content hosted on content aggregator device 160, and further stores URL_P1 that may link to sponsored content hosted on content partner device 1 170-1. For campaign B, content aggregator device B 160-B stores URL_B1 that links to sponsored content hosted on content aggregator device B 160-B, and further stores URL_P1 that links to the sponsored content hosted on content partner device 1 170-1. In this example, URL_P1 may point to the same sponsored content hosted on content partner device 1 170-1. However, because the sponsored content is associated with different campaigns, when URL_P1 is signed by the appropriate security credential generated by content aggregator device A 160-A, the sponsor of campaign A will pay for the sponsored content provided by content partner device 1 170-1. When URL_P1 is signed using the appropriate security credentials generated by content aggregator device B 160-B, the sponsor of campaign B will pay for the sponsored content provided by content partner device 1 170-1.

Content aggregator device A 160-A may generate and store a set of security credentials 312 uniquely associated with itself and content partner device 1 170-1 hosting sponsored content. The security credentials may be used to sign SDS network addresses in order to properly validate requests for sponsored content on a particular host. The set of security credentials 312 may take the form of key pairs which include a signing key identifier and a signing secret (each pair being shown as "Key X" in FIG. 3, where X=A, A_P1). For example, Key A may be uniquely associated with content aggregator device A 160-A and be used to sign requests associated with sponsored content hosted on content aggregator device A 160-A. Key A_P1 may be uniquely associated with content partner device 1 170-1 and content aggregator device A 160-A, and be used to sign requests associated with sponsored content hosted on content partner device 1 170-1 for campaign A.

Content aggregator device B 160-B may generate and store a set of security credentials 316 uniquely associated with itself and content partner device 1 170-1 hosting sponsored content. The security credentials may be used to sign SDS network addresses in order to properly validate requests for sponsored content on a particular host. The set of security credentials 316 may also take the form of key pairs which include a signing key identifier and a signing secret (each pair being shown as "Key X" in FIG. 3, where X=B, B_P1). For example, Key B may be uniquely associated with content aggregator device B 160-B and be used to sign requests associated with sponsored content hosted on content aggregator device B 160-B. Key B_P1 may be uniquely associated with content partner device 1 170-1 and content aggregator device B 160-B, and be used to sign requests associated with sponsored content hosted on content partner device 1 170-1 for campaign B.

Each content partner device 170 may receive a unique security credential from content aggregator devices 160-A, 160-B, associated with campaign A and campaign B, respectively. The security credentials may be provided to SDS portal device 180, which may be subsequently forwarded onto the content partner device 1 170-1. Alternatively, the security credential may be directly provided from content aggregator devices 160-A, 160-B to the content partner device 1 170-1. The security credentials may be unique to content partner device 1 170-1 and each content aggregator device 160A, 160B, and the sharing of the security credentials is restricted such that the security credentials are not shared among different content partner devices 170 or content aggregator devices 160A, 160B. For a different campaign on the same content aggregator device 160, a different security credential may be provided to content partner device 170-1 to maintain security between separate campaigns.

Security credentials are received at content partner device 1 170-1 and stored therein, along with other information in a set of stored security credentials 318. In addition, to the security credential itself, other information may be stored in the set of security credentials 318. In an embodiment, for the credentials associated with content aggregator device A 160-A, content partner device 1 170-1 may store, for example, the identity of the campaign A, the identity of the content partner device 1, the SDS network address associated with sponsored content hosted on content partner device 170-1, and a security key received from content aggregator device A 160-A. For the credentials associated with content aggregator device B 160-B, content partner device 1 170-1 may store, for example, the identity of the campaign B, the identity of the content partner device 1, the SDS network address associated with sponsored content hosted on content partner device 170-1, and a security key received from content aggregator device B 160-B.

Content partner device 170-1 may receive Key A_P1, either indirectly or directly from content aggregator device A 160-A, and may receive Key B_P1, either indirectly or directly from content aggregator device B 160-B. Key A_P1 and Key B_P1 are not shared with any other content partner devices 170, nor with any other content aggregator device which did not generate the respective key. Thus, Key A_P1 is not shared with content aggregator device B 160-B, and Key B_P1 is not shared with content aggregator device A, even though the SDS network address may point to the same sponsored content on content partner device 1 170-1.

Figure 4:
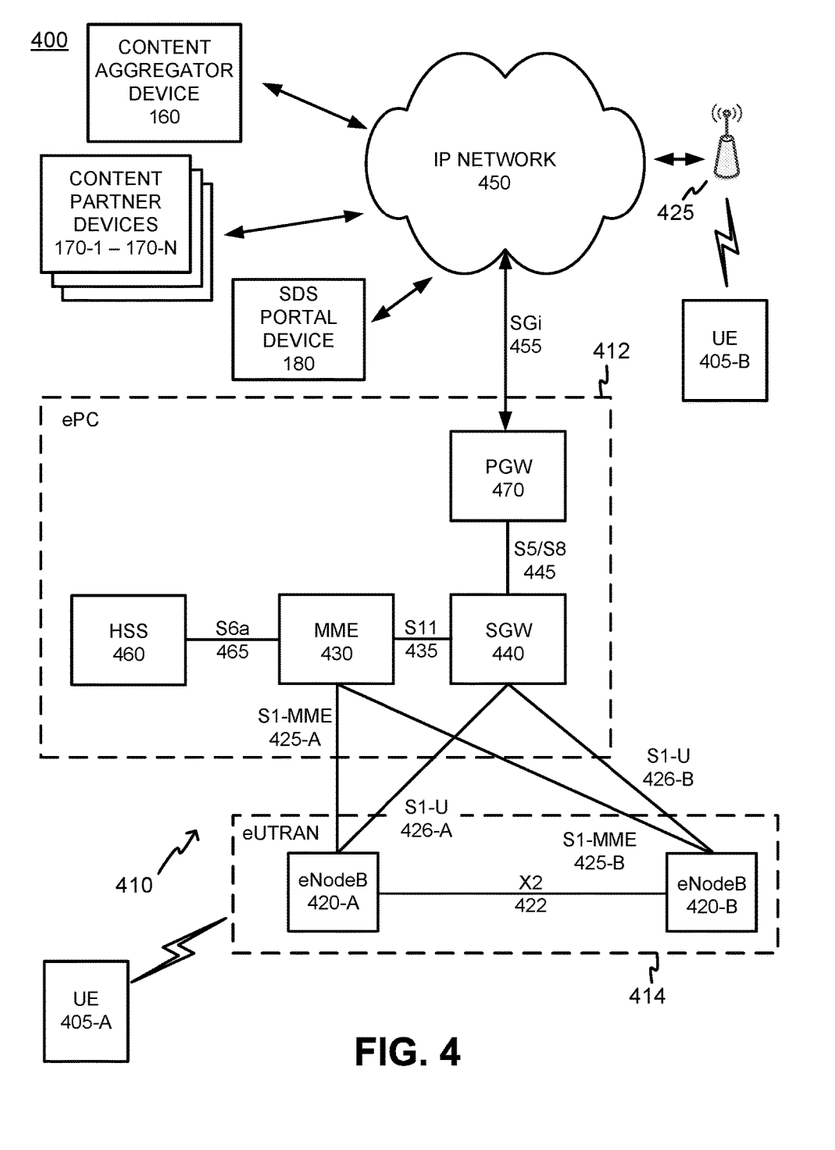
FIG. 4 is a block diagram of an exemplary wireless network environment for providing sponsored data services based on chained security credential distribution.

FIG. 4 is a block diagram of an exemplary networking system 400 that provides sponsored data over various types of wireless channels using chained security credential distribution. As shown in FIG. 4, networking system 400 may include user device 105 embodied as user equipment (UE) 405-A and UE 405-B (as used herein, collectively referred to as "UE 405" and individually as "UE 405-x"), a wireless network 410 which includes an evolved Packet Core (ePC) 412 and an evolved UMTS Terrestrial Network (eUTRAN) 414, an Internet Protocol (IP) network 450, a WiFi wireless access point (WAP) 425, content aggregator device 160, content partner devices 170, and SDS portal device 180.

Wireless network 410 may be a long term evolution (LTE) network, and include one or more devices that are physical and/or logical entities interconnected via standardized interfaces. Wireless network 410 provides wireless packet-switched services and wireless IP connectivity to user devices to provide, for example, data, voice, and/or multimedia services. The ePC 412 may further include a mobility management entity (MME) 430, a serving gateway (SGW) device 440, a packet data network gateway (PGW) 470, and a home subscriber server (HSS) 460. The eUTRAN 414 may further include one or more eNodeBs 420-A and 420-B (herein referred to plurally as "eNodeB 420" and individually as "eNodeB 420-x"). It is noted that FIG. 4 depicts a representative networking system 400 with exemplary components and configuration shown for purposes of explanation. Other embodiments may include additional or different network entities in alternative configurations than which are exemplified in FIG. 4.

Further referring to FIG. 4, each eNodeB 420 may include one or more devices and other components having functionality that allow UE 405 to wirelessly connect to eUTRAN 414. eNodeB 420-A and eNodeB 420-B may each interface with ePC 412 via a S1 interface, which may be split into a control plane S1-MME interface 425-A and a data plane S1-U interface 426. For example, S1-MME interface 425-A may interface with MME device 430. S1-MME interface 425-A may be implemented, for example, with a protocol stack that includes a Network Access Server (NAS) protocol and/or Stream Control Transmission Protocol (SCTP). S1-U interface 426-B may interface with SGW 440 and may be implemented, for example, using a General Packet Radio Service Tunneling Protocol version 2 (GTPv2). eNodeB 420-A may communicate with eNodeB 420-B via an X2 interface 422. X2 interface 422 may be implemented, for example, with a protocol stack that includes an X2 application protocol and SCTP.

MME device 430 may implement control plane processing for ePC 412. For example, MME device 430 may implement tracking and paging procedures for UE 405, may activate and deactivate bearers for UE 405, may authenticate a user of UE 405, and may interface to non-LTE radio access networks. A bearer may represent a logical channel with particular quality of service (QoS) requirements. MME device 430 may also select a particular SGW 440 for a particular UE 405. A particular MME device 430 may interface with other MME devices 430 in ePC 212 and may send and receive information associated with UEs, which may allow one MME device to take over control plane processing of UEs serviced by another MME device, if the other MME device becomes unavailable.

SGW 440 may provide an access point to and from UE 405, may handle forwarding of data packets for UE 405, and may act as a local anchor point during handover procedures between eNodeBs 420. SGW 440 may interface with PGW 470 through an S5/S8 interface 445. S5/S8 interface 445 may be implemented, for example, using GTPv2.

PGW 470 may function as a gateway to IP network 450 through a SGi interface 455. IP network 450 may include, for example, an IP Multimedia Subsystem (IMS) network, which may provide voice and multimedia services to UE 405, based on Session Initiation Protocol (SIP). A particular UE 405, while connected to a single SGW 440, may be connected to multiple PGWs 470, one for each packet network with which UE 405 communicates.

Alternatively, UE 405 may exchange data with IP network 450 though WiFi wireless access point (WAP) 425. The WiFi WAP 425 may be part of a local area network, and access IP network 450 through a wired connection via a router. Alternatively, WiFi WAP 425 may be part of a mesh network (e.g., IEEE 801.11s). WiFi WAP 425 may be part of a local area network, or part of a wide area network (WiMax) or a mesh network (IEEE 801.11s).

MME device 430 may communicate with SGW 440 through an S11 interface 435. S11 interface 435 may be implemented, for example, using GTPv2. S11 interface 435 may be used to create and manage a new session for a particular UE 405. S11 interface 435 may be activated when MME device 430 needs to communicate with SGW 440, such as when the particular UE 405 attaches to ePC 412, when bearers need to be added or modified for an existing session for the particular UE 405, when a connection to a new PGW 470 needs to created, or during a handover procedure (e.g., when the particular UE 405 needs to switch to a different SGW 440).

HSS device 460 may store information associated with UEs 405 and/or information associated with users of UEs 405. For example, HSS device 460 may store user profiles that include authentication and access authorization information. MME device 430 may communicate with HSS device 460 through an S6a interface 465. S6a interface 465 may be implemented, for example, using a Diameter protocol.

Content aggregator device 160 may be any type of web server, media repository, streaming source, etc., that can provide UE 405 with sponsored content which is locally hosted, or provide signed SDS network addresses for UE 405 to request sponsored content from content partner device(s) 170. Content aggregator device 160 may exchange information using a standard TCP/IP interface with IP network 450, and further communicate with ePC 412 using SGi 455. Communications between content aggregator device 160 and UEs 405 may be performed through ePC 412 and eUTRAN 414 as shown for UE 405-A, or through WiFi WAP 425 as shown for UE 405-B. The communications between content aggregator device 160 and UE 405 may be channel agnostic, and thus may be performed using any known wireless and/or wired channels, or combinations thereof. Accordingly, other methods for communication between content aggregator device 160 and UE 405 may be used which are not illustrated in FIG. 4.

Content partner device(s) 170 may be any type of web server, media repository, streaming source, etc., that can provide UE 405 with content which is requested by the user through a signed SDS network address provided by content aggregator device 160. Content partner device(s) 170 may provide any form of media, text, audio, image, video, etc., which can be requested by the user through UE 405. Moreover, content partner device(s) 170 may provide simultaneous broadcast of data to a plurality of UEs 405 using simulcast and/or multicast techniques, such as, for example, any type of multimedia broadcast multicast service (MBMS) and/or evolved MBMS (eMBMS) over LTE. In one embodiment, UE 405 may provide a request to content partner device(s) 170 over wireless network 410. The request for sponsored data access may be initially received by the eUTRAN 414, and then forwarded through gateways SGW 440 and PGW 470 to content partner device 170.

SDS portal device 180 may be any type of web server, computer, network device, etc. that may be used to generate and modify a campaign for sponsored data based on information received from sponsor controlled devices, such as, for example, content aggregator device 160. In embodiments provided herein, the sponsor may designate content aggregator device 160 to create the campaign by logging into SDS portal device 180 to supply campaign network addresses and customer identifiers associated with the campaign network addresses. SDS portal device 180 may exchange information with content aggregator device 160 and content partner device(s) 170 using, for example, a standard TCP/IP interface with IP network 450.

While FIG. 4 shows exemplary components of system 400, in other implementations, networking system 400 may include fewer components, different components, differently arranged components, or additional components than depicted in FIG. 4. Additionally, or alternatively, one or more components of networking system 400 may perform functions described as being performed by one or more other components of networking system 400.

Figure 5:
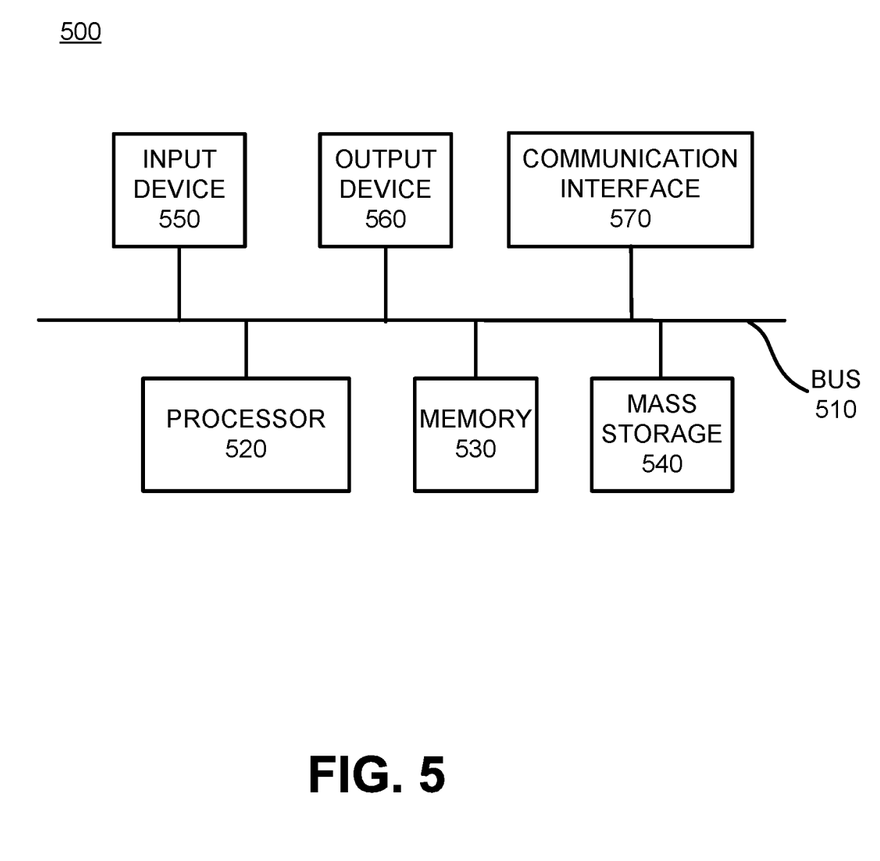
FIG. 5 is a block diagram showing exemplary components of a content aggregator device according to an embodiment.

FIG. 5 is a block diagram showing exemplary components of a content aggregator device 500 according to an embodiment. Content aggregator device 500 may include a bus 510, a processor 520, a memory 530, mass storage 540, an input device 550, an output device 560, and a communication interface 570. Other devices in environment 100, such as content partner device 170 and SDS portal device 180 may be configured in a similar manner.

Bus 510 includes a path that permits communication among the components of content aggregator device 500. Processor 520 may include any type of single-core processor, multi-core processor, microprocessor, latch-based processor, and/or processing logic (or families of processors, microprocessors, and/or processing logics) that interprets and executes instructions. In other embodiments, processor 520 may include an application-specific integrated circuit (ASIC), a field-programmable gate array (FPGA), and/or another type of integrated circuit or processing logic. For example, processor 520 may be an x86 based CPU, and may use any operating system, which may include varieties of the Windows, UNIX, and/or Linux operating systems. Processor 520 may also use high-level analysis software packages and/or custom software written in any programming and/or scripting languages for interacting with other network entities are communicatively coupled to WAN 150.

Memory 530 may include any type of dynamic storage device that may store information and/or instructions, for execution by processor 520, and/or any type of non-volatile storage device that may store information for use by processor 520. For example, memory 530 may include a random access memory (RAM) or another type of dynamic storage device, a read only memory (ROM) device or another type of static storage device, and/or a removable form of memory, such as a flash memory. Mass storage 540 may include any type of on-board device suitable for storing large amounts of data, and may include one or more hard drives, solid state drives, and/or various types of redundant array of independent disks (RAID) arrays. Mass storage device 540 would be suitable for storing files associated SDS network addresses, security credentials, sponsored content data, etc.

Input device 550, which may be optional, can allow an operator to input information into content aggregator device 500, if required. Input device 550 may include, for example, a keyboard, a mouse, a pen, a microphone, a remote control, an audio capture device, an image and/or video capture device, a touch-screen display, and/or another type of input device. In some embodiments, content aggregator device 500 may be managed remotely and may not include input device 550. Output device 560 may output information to an operator of content aggregator device 500. Output device 560 may include a display (such as a liquid crystal display (LCD)), a printer, a speaker, and/or another type of output device. In some embodiments, content aggregator device 500 may be managed remotely and may not include output device 560.

Communication interface 570 may include a transceiver that enables content aggregator device 500 to communicate within network 115 with other devices and/or systems. The communications interface 570 may be configured to exchange data with WAN 150 over wired communications (e.g., conductive wire, twisted pair cable, coaxial cable, transmission line, fiber optic cable, and/or waveguide, etc.), or a combination of wireless. In other embodiments, communication interface 570 may interface with wide area network 150 using a wireless communications channel, such as, for example, radio frequency (RF), infrared, and/or visual optics, etc. Communication interface 570 may include a transmitter that converts baseband signals to RF signals and/or a receiver that converts RF signals to baseband signals. Communication interface 570 may be coupled to one or more antennas for transmitting and receiving RF signals. Communication interface 570 may include a logical component that includes input and/or output ports, input and/or output systems, and/or other input and output components that facilitate the transmission/reception of data to/from other devices. For example, communication interface 570 may include a network interface card (e.g., Ethernet card) for wired communications and/or a wireless network interface (e.g., a WiFi) card for wireless communications. Communication interface 570 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

As described below, content aggregator device 500 may perform certain operations relating to facilitating secure access to sponsored content. content aggregator device 500 may perform these operations in response to processor 520 executing software instructions contained in a computer-readable medium, such as memory 530 and/or mass storage 540. The software instructions may be read into memory 530 from another computer-readable medium or from another device. The software instructions contained in memory 530 may cause processor 520 to perform processes described herein. Alternatively, hardwired circuitry may be used in place of, or in combination with, software instructions to implement processes described herein. Thus, implementations described herein are not limited to any specific combination of hardware circuitry and software.

Although FIG. 5 shows exemplary components of content aggregator device 500, in other implementations, content aggregator device 500 may include fewer components, different components, additional components, or differently arranged components than depicted in FIG. 5.

Figure 6A:
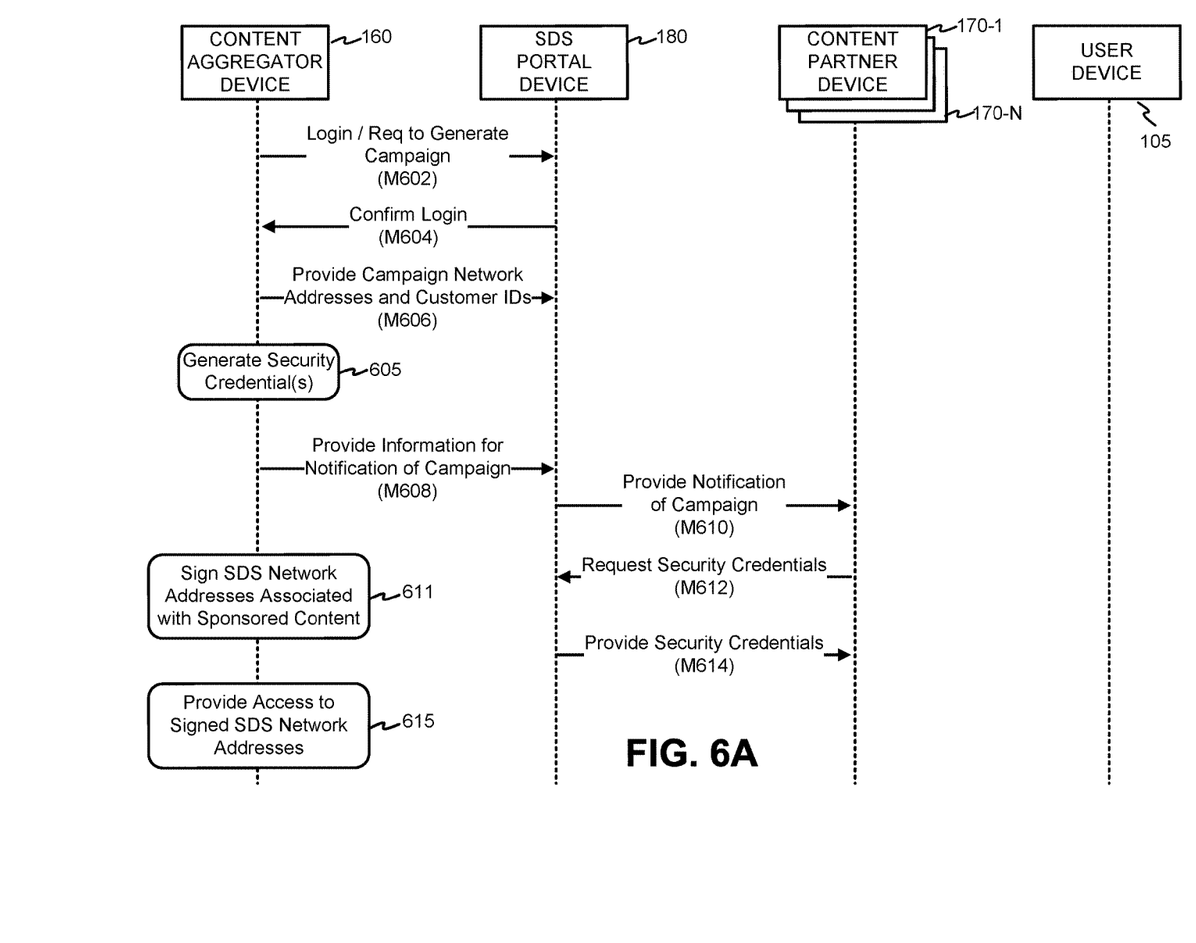
FIGS. 6A and 6B are diagrams depicting exemplary message flows between selected devices within the network environment shown in FIG. 1.
Figure 6B:
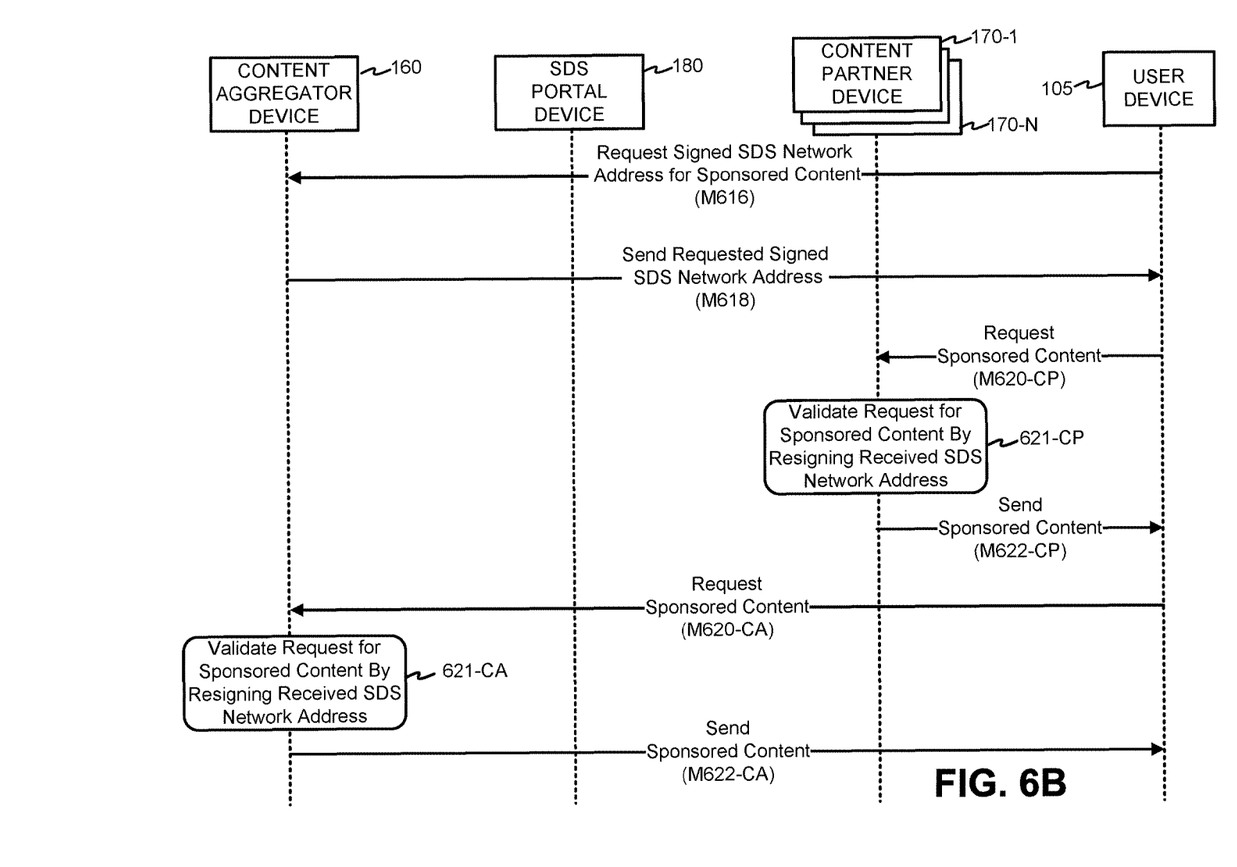

FIGS. 6A and 6B are diagrams depicting exemplary message flows between selected modules and devices within the network environment 100 shown in FIG. 1. Specifically, message flows between user device content aggregator device 160, SDS portal device 180, one or more content partner device 170-1 through 170-N (where 1≤N≤M) that are participating in the campaign, and user device 105.

Referring to FIG. 6A, content aggregator device 160 may send a request to login to generate a campaign for sponsored data (M602). Content aggregator device 160 may be owned by the sponsor of the campaign, or acting under control of the sponsor. SDS portal device 180 may receive the request for login, verify the login credentials of the content aggregator device 160, and send a message back to content aggregator device 160 to confirm a successful login (M604). Content aggregator 160 may request to have a campaign generated, and provide campaign network addresses and customer identifiers of content aggregator 160 and/or content partner devices(s) 170 participating in the campaign (M606). The campaign network addresses may serve as a basis to link to sponsored content on the respective device associated with a particular campaign network address. For example, the entered campaign network addresses may link to respective web servers on content aggregator device 160 and to content partner devices(s) 170 participating in the campaign. The entered campaign network addresses may also serve a basis to generate sub-domain URLs which link to sponsored content hosted on the device associated with the campaign URL. The customer identifiers (e.g., customer numbers) may identify an entity in control (e.g., owner) of the device associated with their respective campaign network address provided by content aggregator device 160. In other words, content aggregator device 160 may provide customer identifiers for the content aggregator 160 itself, and for content partner device(s) 170 participating in the campaign.

Content aggregator device 160 may then generate security credentials for itself, and for each content partner device 170 participating in the campaign (Block 605). The security credentials may include, for example, a signing key identifier (ID) and a signing secret. Once the security credentials are generated, the content aggregator device 160 may provide information for the generation of individual notification(s) to be sent to each content partner device 170 participating in the campaign. The information for notification(s) may be sent to SDS portal device 180 (M608). The notification sent to SDS portal device 180 may include a data structure that includes the following information: 1) an identification of a "generator" of the campaign, which may be the customer identifier of content aggregator device 160; 2) an identification of a "benefiter" of the campaign, which may be the customer identifier of content partner device 170-X participating in the campaign; 3) the campaign network identifier (e.g., campaign URL) created for content partner device 170-X, and the network credentials for content partner device 170-X (e.g., a signing key ID and a signing secret). As provided above, the "generator" of the campaign is the entity which established the campaign with the SDS portal device 180, which may typically be content aggregator device 160. The "benefiter" of the campaign may be a content partner device 170, which benefits from remuneration of providing sponsored content. It should be noted that in some instances, the content aggregator may be a "benefiter" upon providing requested sponsored content which is hosted on content aggregator device 160.

Upon receiving the information for notifications in M608, SDS portal device 180 will generate and provide notifications to each content partner device 170 identified by content aggregator device 160 as participating in the campaign (M610). In response, the notified content partner device(s) 170 may log into SDS portal device 180 and request its associated security credentials (M612). In response to the request provided in M612, SDS portal device 180 will provide unique security credentials to each requesting content partner device 170 (M614). In another embodiment, SDS portal device 180 may push the appropriate security credential to each content partner device 170 participating in the campaign. Alternatively, content aggregator device 160 may provide the appropriate security credential to each content partner device 170 participating in the campaign (not shown in FIG. 6A).

Content aggregator device 160 may sign each SDS network addresses associated with sponsored content, which may include SDS network addresses linked to sponsored content hosted on content aggregator device 160, and/or sponsored content hosted on content partner device(s) 170 (Block 611). When signing the SDS network addresses associated with sponsored content on the content aggregator device 160, content aggregator device 160 uses the security credential generated for content aggregator device 160 in Block 605. When signing SDS network addresses associated with sponsored content on content partner device(s) 170-1 through 170-N, content aggregator device 160 uses the unique security credential generated for each content partner device 170-1 through 170-N to sign the SDS network address associated with sponsored content hosted on the appropriate content partner device 170-1 through 170-N. Once the SDS network addresses are signed, content aggregator device 160 may provide access to the signed SDS network addresses to requesting user devices 105 (Block 615). In an embodiment, content aggregator device 160 may create a "parent page" providing a listing of signed SDS URLs linking to sponsored content, where the SDS URLs may be subdomains of the campaign URLs associated with content aggregator device 160 and/or content partner device(s) 170-1 through 170-N.

Referring to FIG. 6B, user device 105 may request access to sponsored content via a signed SDS network address linking to sponsored content desired by a user (M616). In an embodiment, the request may take the form of an HTML request by accessing the appropriate signed SDS URL listed on the parent page (M618). If the requested signed SDS network address links to content hosted on content partner device 170-X, a request for sponsored content will be sent to content partner device 170-X (M620-CP). The content partner device 170-X may validate the request for sponsored content by re-signing the received signed SDS network address (hereinafter the "re-signed SDS network address) using the security credentials received in M614 (Block 621-CP). Content partner device 170-X may validate the request by comparing portions of the received signed SDS network address for a match with the re-signed SDS network address. If a match is determined, the request is validated, and content partner device 170-X may send the requested sponsored content to user device 105 (M622-CP). Validation of requests may be performed in the aforementioned manner as the content aggregator device 160 and content partner device(s) 170 have agreed on common rules for signing SDS network addresses.

If the requested signed SDS network address links to content hosted on content aggregator device 160, signed SDS network address received in M618 will link to the content aggregator device 160. User device 105 may send a request for sponsored content to content aggregator device 160 (M620-CA). Content aggregator device 160 may then validate the request for sponsored content received in M620-CA by re-signing the received signed SDS network address using the security credentials originally generated by content aggregator device 160 in Block 605 shown in FIG. 6A (Block 621-CA). Content aggregator device 160 may validate the request by comparing portions of the received signed SDS network address for a match with the re-signed SDS network address. If a match is determined, the request is validated, and content aggregator device 160 may send the requested sponsored content to user device 105 (M622-CA).

Figure 7:
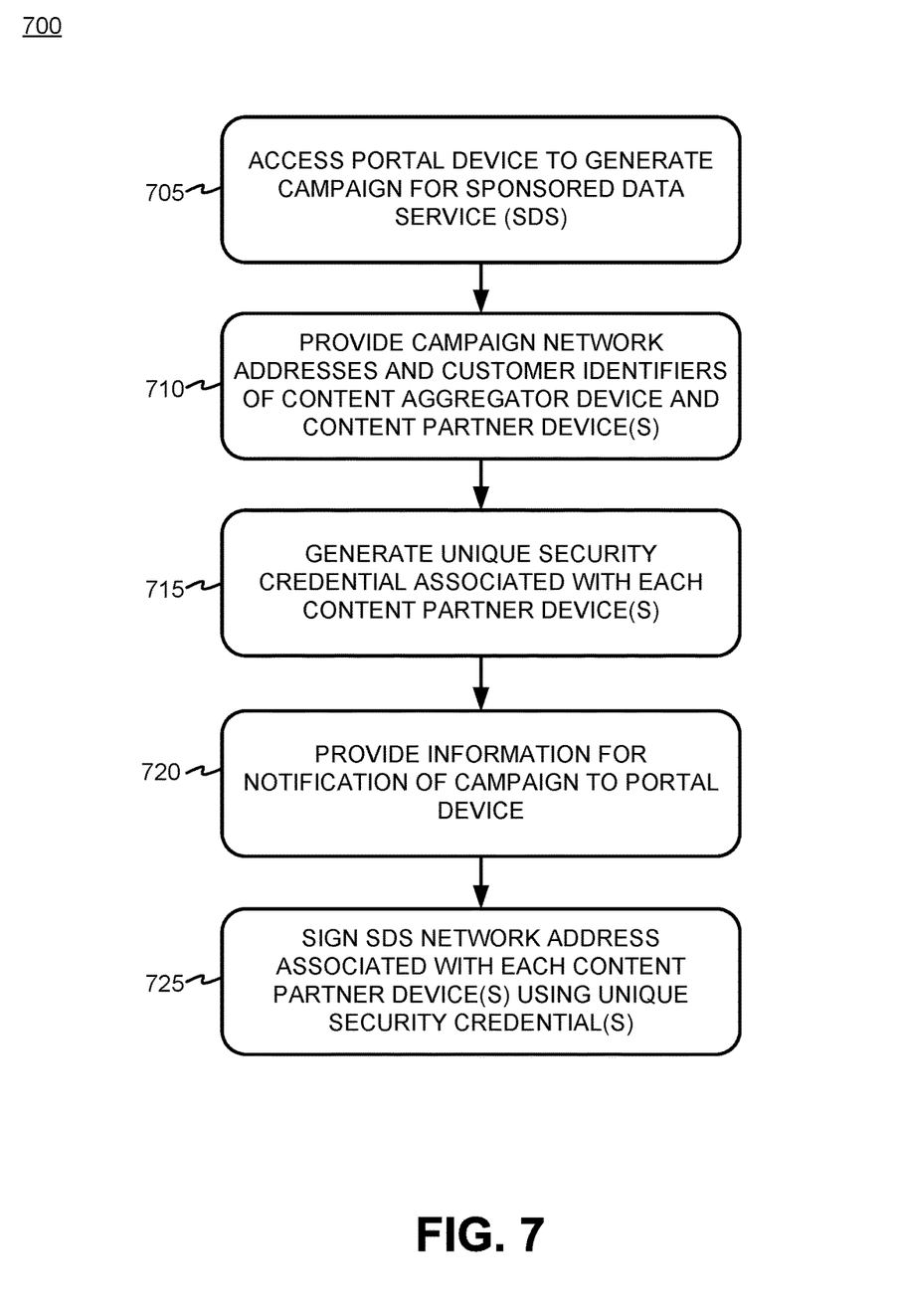
FIG. 7 is a flow chart showing an exemplary process for obtaining data access through a sponsored data service.

FIG. 7 is a flow chart showing an exemplary process 700 for facilitating secure access to sponsored content. In an embodiment, process 700 may be performed at content aggregator device 160, by processor 520 executing instructions stored in memory 530, mass storage device 540, and/or downloaded through communication interface 570.

Initially, content aggregator device 160 may access SDS portal device 180 to generate a campaign for a sponsored data service (SDS) (Block 705). In an embodiment, content aggregator device 160 may provide campaign network addresses and customer identifiers. The provided campaign network address may include a network address and a customer identifier associated with content aggregator device 160, and also include network address(es) and customer identifier(s) associated with content partner device(s) 170 (Block 710). In an embodiment, the campaign network address may include universal resource locators (URLs), and the campaign identifiers may include customer service numbers as customer identifiers. The campaign URLs may be used to create subdomains for SDS network addresses (e.g., SDS URLs) which link to sponsored content on content aggregator device 160 and/or content partner device(s) 170.

Content aggregator device 160 may then generate a unique first security credential associated with each of the content partner device (Block 715). In an embodiment, the security credential may comprise one or more pieces of data, and thus the content aggregator device 160 may generate signing key identifier (ID) and a signing secret associated with the signing key identifier in Block 715 for content partner device(s) 170.

Once content aggregator device 160 generates the unique security credential for each content partner device 170, content aggregator device 160 may provide information for a notification of the campaign to SDS portal device 180. The information may include the unique first security credential associated with content partner device(s) 170. In an embodiment, SDS portal device 160 may generate a notification based on the information, and send the notification to each content partner device(s) 170 participating in the campaign (Block 720). In an embodiment, the information for the notification may include the customer identifier of content aggregator device 160 as a generator for the campaign, the customer identifier of content partner device 170-X as a benefiter of the campaign, the campaign network address associated with content partner device 170-X, and the first security credential of content partner device 170-X.

Content aggregator device 160 may sign the unique first SDS network address associated with sponsored content provided by each content partner device 170, where the signing is performed using the unique first security credential associated with each content partner device 170 (Block 725). In an embodiment, an SDS network address (e.g. an SDS URL) may be "signed" using cryptographic techniques to improve security, where the signing process may include appending information to the original network address (e.g., the embedded object URL) based on one or more security credentials (e.g., a signing key identifier and/or a signing secret). The signed SDS network address may contain special network destination information of the sponsored content, identifiers of various entities (e.g., a sponsor, a content provider, a content aggregator, etc.), a security signature, and additional parameters that may be used in backend devices by the network provider for data accounting and billing processes.

In an embodiment, the signing may be performed based on a keyed-hash message authentication code (HMAC) which is a process for calculating a message authentication code (MAC) involving a cryptographic hash function in combination with a secret cryptographic key. As with any MAC, the HMAC process may be used to simultaneously verify both the data integrity and the authentication of a message. Any cryptographic hash function, such as MD5 or SHA-1, may be used in the calculation of an HMAC.

In an embodiment, signing an SDS network address may include having either content aggregator device 160 and/or content partner device 170 identify a generator for the campaign, identify a benefiter for the campaign, and determining a signing security credential based on the identity of the generator and the identity of the benefiter. The identification steps may be based on information received in the SDS network address used to request sponsored content. In an embodiment, the signing credential may include a signing key ID and a signing secret. Thus, the SDS network address may include a URL associated with sponsored content (e.g., and embedded object URL), and further include an identifier indicating a generator for the campaign, and identifier indicating a benefiter for the campaign, the signing key identifier, and a signing signature, wherein the signing signature is based upon the signing key identifier and the signing secret.

In an embodiment, content aggregator device 160 may further generate a second security credential associated with the content aggregator device 160 itself. Generating the second security credential may include signing a second SDS network address corresponding to sponsored content provided by content aggregator device 160, where the signing is performed using the second security credential. Content aggregator device 160 may further provide access to the signed first SDS network address(es) and the signed second SDS network address(es) to a user device. User device 105 may request access to the sponsored content hosted by content aggregator device 160 and/or content partner device(s) 170.

Accordingly, content aggregator device 160 may receive a request from user device 105 via a selected signed first SDS network address for the sponsored content hosted by an associated content partner device 170-X. Associated content partner device 170-X may re-sign the selected signed first SDS network address associated with the request, determine a validity of the request by comparing segments of the selected re-signed first SDS network address and the selected signed first SDS network address, and provide sponsored content to the user device which is hosted by associated content partner device 170-X, upon determining the request is valid. For content partner device 170-X to perform the signing, the requesting SDS network address may identify content aggregator device 160 as the generator, and associated content partner device 170-X may be identified as the benefiter. Content partner device 170 may then determine that the first security credential is the signing security credential, based on the provided identifications of the generator and the benefiter of the campaign.

In another embodiment, content aggregator device 160 may receive a request from the user device via a selected signed second SDS network address for the sponsored content hosted by content aggregator device 160. Content aggregator device 160 may re-sign the selected signed second SDS network address associated with the request, and determine a validity of the request by comparing segments of the re-signed selected second SDS network address and the selected signed second SDS network address. Content aggregator device 160 may provide the sponsored content hosted by the content aggregator device 160 to user device 105 upon determining the request is valid. For content aggregator device 160 to perform the signing, the requesting SDS network address may identify content aggregator device 160 as the generator and as the benefiter. Content aggregator device 160 may then determine that the second security credential is the signing security credential, based on the provided identifications of the generator and the benefiter of the campaign.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 6A, 6B, and 7, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   accessing, by a content aggregator device, a portal device to generate a campaign for a sponsored data service (SDS);
   providing, by the content aggregator device to the portal device, campaign network addresses and customer identifiers associated with the content aggregator device and at least one content partner device;

generating, at the content aggregator device, a unique first security credential associated with each of the at least one content partner device;

providing information for a notification of the campaign to the portal device, wherein the information includes the unique first security credential associated with each of the at least one content partner device, and wherein the notification is provided to each of the at least one content partner device; and signing, at the content aggregator device, a unique first SDS network address associated with sponsored content provided by each of the at least one content partner device, wherein the signing is performed using the unique first security credential associated with each of the at least one content partner device, wherein signing the unique first SDS network address further comprises:
identifying a generator for the campaign,
identifying a benefiter for the campaign, and
determining a signing security credential based on the identified generator and benefiter.

2. The method of claim 1, wherein the notification to the at least one content partner device further comprises:
the customer identifier of the content aggregator device as the generator for the campaign, providing the customer identifier of the at least one content partner device as the benefiter of the campaign, providing the campaign network address of the at least one content partner device, and providing the first security credential of the at least one content partner device.

3. The method of claim 1, further comprising:
generating, at the content aggregator device, a second security credential associated with the content aggregator device;
signing, at the content aggregator device, a second SDS network address corresponding to sponsored content provided by the content aggregator device, wherein the signing is performed using the second security credential; and
providing access to the at least one signed first SDS network address and the signed second SDS network address to a user device, wherein the user device requests access to the sponsored content hosted by at least one of the content aggregator device or the at least one content partner device.

4. The method of claim 3, further comprising:
receiving a request from the user device via a selected signed first SDS network address for the sponsored content hosted by an associated content partner device, wherein the associated content partner device re-signs the selected signed first SDS network address associated with the request, determines a validity of the request by comparing segments of the selected re-signed first SDS network address and the selected signed first SDS network address, and provides, to the user device, sponsored content hosted by the associated content partner device upon determining the request is valid.

5. The method of claim 4, wherein when the content aggregator device is identified as the generator and the associated content partner device is identified as the benefiter, the content partner device determines that the first security credential is the signing security credential.

6. The method of claim 3, further comprising:
receiving a request from the user device via a selected signed second SDS network address for the sponsored content hosted by the content aggregator device;
re-signing the selected signed second SDS network address associated with the request;
determining a validity of the request by comparing segments of the re-signed selected second SDS network address and the selected signed second SDS network address; and
providing, to the user device, the sponsored content hosted by the content aggregator device upon determining the request is valid.

7. The method of claim 6, wherein when the content aggregator device is identified as the generator and the benefiter, the determining the signing security credential further comprises:
determining that the second security credential is the signing security credential.

8. The method of claim 1, wherein providing the campaign network addresses and customer identifiers further comprises:
providing universal resource locators (URLs) as the campaign network addresses and customer service numbers as the customer identifiers.

9. The method of claim 1, wherein generating the unique first security credential further comprises:
generating a signing key identifier; and
generating a signing secret associated with the signing key identifier.

10. The method of claim 9, wherein an SDS network address includes a URL associated with sponsored content, and further includes an identifier indicating the generator for the campaign, an identifier indicating the benefiter for the campaign, the signing key identifier, and a signing signature, wherein the signing signature is based upon the signing key identifier and the signing secret.

11. A content aggregator device, comprising:
an interface configured to communicate with a network;
a memory configured to store instructions; and
a processor, coupled to the interface and the memory, wherein the stored instructions, when executed by the processor, cause the processor to:
access a portal device to generate a campaign for a sponsored data service (SDS),
provide, to the portal device, campaign network addresses and customer identifiers associated with the content aggregator device and at least one content partner device,
generate a unique first security credential associated with each of the at least one content partner device,
provide information for a notification of the campaign to the portal device, wherein the information includes the unique first security credential associated with each of the at least one content partner device, and wherein the notification is provided to each of the at least one content partner device, and
sign a unique first SDS network address associated with sponsored content provided by each of the at least one content partner device, wherein the signing is performed using the unique first security credential associated with each of the at least one content partner device,
wherein the instructions to sign the unique first SDS network address further cause the processor to:
identify a generator for the campaign,
identify a benefiter for the campaign, and determine a signing security credential based on the identified generator and benefiter.

12. The content aggregator device of claim 11, wherein the notification to the at least one content partner device comprises:
the customer identifier of the content aggregator device as the generator for the campaign, provide the customer identifier of the at least one content partner device as the benefiter of the campaign, provide the campaign network address of the at least one content partner device, and provide the first security credential of the at least one content partner device.

13. The content aggregator device of claim 11, wherein the instructions, when executed by the processor, further cause the processor to:
generate a second security credential associated with the content aggregator device,
sign a second SDS network address corresponding to sponsored content provided by the content aggregator device, wherein the signing is performed using the second security credential, and
provide access to the at least one signed first SDS network address and the signed second SDS network address to a user device, wherein the user device requests access to the sponsored content hosted by at least one of the content aggregator device or the at least one content partner device.

14. The content aggregator device of claim 13, further comprising instructions that cause the processor to:
receive a request from the user device via a selected signed first SDS network address for the sponsored content hosted by an associated content partner device,
re-sign the selected signed first SDS network address associated with the request,
determine a validity of the request by comparing segments of the selected re-signed first SDS network address and the selected signed first SDS network address, and
provide, to the user device, the sponsored content hosted by the associated content partner device upon determining the request is valid.

15. The content aggregator device of claim 14, wherein when the content aggregator device is identified as the generator and the associated content partner device is identified as the benefiter, the instructions to determine the signing security credential further cause the processor to:
determine that the first security credential is the signing security credential.

16. The content aggregator device of claim 13, further comprising instructions that cause the processor to:
receive a request from the user device via a selected signed second SDS network address for the sponsored content hosted by the content aggregator device,
re-sign the selected signed second SDS network address associated with the request,
determine a validity of the request by comparing segments of the re-signed selected second SDS network address and the selected signed second SDS network address, and
provide, to the user device, sponsored content hosted by the content aggregator device upon determining the request is valid.

17. The content aggregator device of claim 16, wherein when the content aggregator device is identified as the generator and the benefiter, the instructions to determine the signing security credential further cause the processor to:
determine that the second security credential is the signing security credential.

18. A non-transitory computer-readable medium comprising instructions, which, when executed by a processor, cause the processor to:
access a portal device to generate a campaign for a sponsored data service (SDS),
provide, to the portal device, campaign network addresses and customer identifiers associated with a content aggregator device and at least one content partner device,
generate a unique first security credential associated with each of the at least one content partner device,
provide information for a notification of the campaign to the portal device, wherein the information includes the unique first security credential associated with each of the at least one content partner device, and wherein the notification is provided to each of the at least one content partner device, and
sign a unique first SDS network address associated with sponsored content provided by each of the at least one content partner device, wherein the signing is performed using the unique first security credential associated with each of the at least one content partner device,
wherein the instructions to sign the unique first SDS network address further cause the processor to:
identify a generator for the campaign,
identify a benefiter for the campaign, and
determine a signing security credential based on the identified generator and benefiter.

19. The non-transitory computer-readable medium of claim 18, further comprising instructions, which when executed by the processor, cause the processor to:
generate a second security credential associated with the content aggregator device;
sign a second SDS network address corresponding to sponsored content provided by the content aggregator device, wherein the signing is performed using the second security credential; and
provide access to the at least one signed first SDS network address and the signed second SDS network address to a user device, wherein the user device requests access to the sponsored content hosted by at least one of the content aggregator device or the at least one content partner device.

20. The non-transitory computer-readable medium of claim 19, further comprising instructions, which when executed by the processor, cause the processor to:
receive a request from the user device via a selected signed first SDS network address for the sponsored content hosted by an associated content partner device;
re-sign the selected signed first SDS network address associated with the request;
determine a validity of the request by comparing segments of the selected re-signed first SDS network address and the selected signed first SDS network address; and
provide, to the user device, the sponsored content hosted by the associated content partner device upon determining the request is valid.

\* \* \* \* \*